W. E. SHERBONDY.
GREASE GUN.
APPLICATION FILED JULY 22, 1910.
1,013,454.
Patented Jan. 2, 1912.
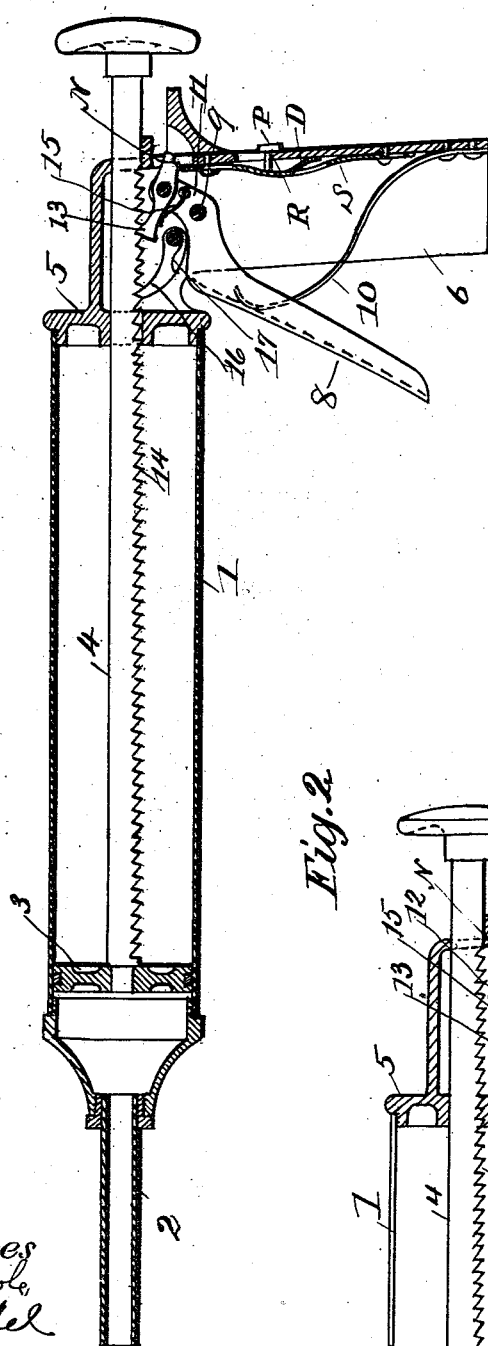
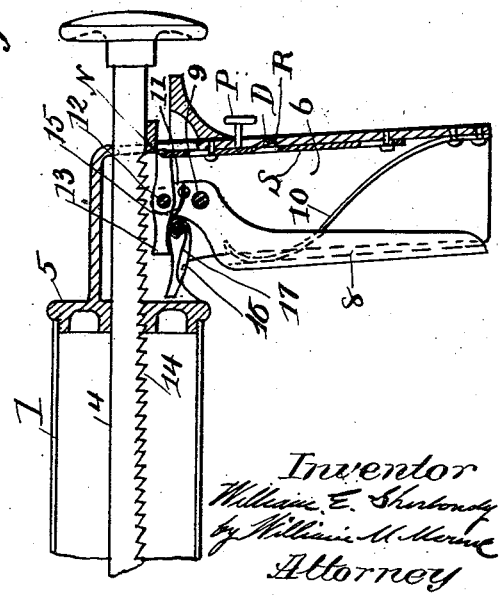

UNITED STATES PATENT OFFICE.

WILLIAM E. SHERBONDY, OF CLEVELAND, OHIO.

GREASE-GUN.

1,013,454.    Specification of Letters Patent.    Patented Jan. 2, 1912.

Application filed July 22, 1910. Serial No. 573,244.

*To all whom it may concern:*

Be it known that I, WILLIAM E. SHERBONDY, a citizen of the United States, and resident of Cleveland, in the county of Cuyahoga and State of Ohio, have invented certain new and useful Improvements in Grease-Guns, of which I hereby declare the following to be a full, clear, and exact description, such as will enable others skilled in the art to which it appertains to make and use the same.

The objects of the invention are to provide a manually operated grease or oil gun adapted particularly for use in injecting lubricant forcibly into the working parts of an automobile or of machinery such as the gear case or other parts which are difficult of access by ordinary means, and it is designed to be an improvement in the art and to have increased efficiency and practicability over devices now in use.

The device comprises a cylinder, a piston therein and manually operated means for moving the piston to discharge the lubricant, and an automatically acting means for preventing the rebound or return of the piston caused by the internal pressure of the air or grease compressed therein until it is desired to release the instrument.

The invention comprises pawl and rack operating devices and a locking device in connection with a rigid handle, and a finger operated lever for actuating the operating pawl, and also has reference to means for releasing the pawls and returning the lever, and further comprises the combination and arrangement of parts and construction of details as hereinafter described, shown in the accompanying drawings and specifically pointed out in the claims.

In the accompanying drawings Figure 1 is a longitudinal central section of the device showing an operating and retaining pawl in engagement with a rack upon the piston rod; Fig. 2 is a similar view showing both of the pawls released from the teeth of the rack and locked in their positions.

In these views 1 is the cylinder, 2 is a reduced nozzle therefor, 3 is the piston, 4 is the piston rod or stem which passes through an outer head 5 which forms a bearing for the outer end of the rod. To this head is rigidly secured or integral therewith the handle 6 which is formed of such shape as to be readily grasped by the hand and is preferably hollow to contain the operating parts. 8 is a lever pivoted at 9 on the handle and the lower end thereof is normally thrown out by a spring 10. This lever is of such a shape as to be readily pulled back into the handle by the fingers of the hand which grasps the handle. At the upper end of this lever is the projection 11 to which is pivoted at 12 a pawl 13 which is adapted when raised to engage the teeth of a rack 14 on one side of the piston rod, a spring 15 normally throws the pawl into engagement with the rack so that when the lever is drawn inwardly the piston and rod will be pushed forward a short distance into the cylinder to project the grease therefrom. As soon as released the lever will be again thrown out and the pawl 13 will be retracted and will reëngage the rack ready for another forward movement. By constant repetition of these movements the lubricant can be gradually discharged and can be projected in small quantities at a time where required, the small nozzle serving to permit of exact application.

It has been found that some device for preventing rebound or rearward movement of the piston after discharge is necessary owing to the amount of air which is drawn into the cylinder when it is filled by drawing back the piston, and the elasticity of the material used. This air and grease when compressed by the forward movement of the piston forms a cushion which will force back the piston after every movement of the lever, and hence would tend to make the device more or less impractical in use. For this reason it is desirable to provide a retaining means adapted to operate automatically as soon as the forward piston movement ceases. To accomplish this action a second or locking pawl 16 is employed adapted to engage the rack at the same time with the operating pawl and prevent backward movement of the piston, but not forward movement thereof. A spring 17 maintains this engagement constant. The piston can be operated by hand in the forward direction when the pawls are engaging.

When it is desired to fill the gun and when ordinary fluid oil lubricant is used, the operating and locking pawls must be released from the rack so that the piston can be operated by hand. To accomplish this object a flat spring plate or strip S is slidingly attached to the wall of the handle and the operating pawl is provided with a notch N which the upper extremity of the plate S engages when said plate is moved toward the piston rod 4. By means of the sliding plate the operating pawl can be thrown down out of contact with the rack, and in its movement a rearward projection on it will strike against the locking pawl and withdraw that also from contact with the rack. This movement occurs when the lever and pawls are in the position shown in Fig. 2. A spring detent D which may be an integral part of the plate S will then engage a shoulder R in the wall of the handle and the parts are securely locked. The plate and pawls can be released by means of the push pin P which removes the detent D from the shoulder R and the sliding plate can then be removed from contact with the operating pawl. The lever is simultaneously released with the release of the pawls and flies back to the position shown in Fig. 1. It is obvious that the operating and locking pawls can be temporarily thrown out of engagement with the piston rod by merely rotating the piston rod by means of the knob on the end of the rod, and they can be thrown into engagement with the rack by rotating the piston rod back again. When out of engagement with the pawls the piston rod and piston can be drawn backward manually and quickly.

Having described the invention what I claim as new and desire to secure by Letters Patent is:

1. In a grease gun, in combination, a cylinder, a piston and rod therein, a rack on the piston rod, a rigid handle for the gun arranged at right angles thereto, a lever pivoted thereon, an operating pawl for said rack pivoted on said lever, a locking pawl for said rack pivoted on the handle, and a sliding device for releasing said pawls.

2. In a grease gun, in combination, a cylinder, a piston and piston rod, a rack on the piston rod, a cylinder head and a handle secured at an angle thereto, and a lever pivoted on the handle, an operating pawl pivoted on said lever and engaging said rack, a locking pawl pivoted on the handle, a sliding releasing device for both said pawls, said releasing means serving also to lock said lever, a return spring for said lever, and a return spring for said operating pawl on said lever, and a return spring for said locking pawl on said handle.

3. In a grease gun, in combination, a cylinder, a piston and piston rod therefor, a handle, an operating pawl, and a rack for operating the piston in one direction, a pivoted lever to which the operating pawl is pivoted, a locking pawl pivoted to said handle, both said pawls spring actuated to retain them in engagement with said rack, said operating pawl provided with a rearward projection and shoulder thereon, and a strip slidingly mounted in said handle and adapted to engage said shoulder to remove said operating pawl from contact with the said rack, the said operating pawl being adapted to strike and also release said locking pawl.

4. In a grease gun, in combination, a cylinder, a piston and piston rod therefor, a cylinder head and a handle secured to said cylinder, said piston rod having a rack on one side, a lever pivoted on said handle, a spring actuated operating pawl pivoted on said lever, and adapted normally to engage said rack, a spring actuated locking pawl pivoted on said handle, means for releasing said operating pawl from said rack, and for locking the same to prevent contact with said rack, said operating pawl adapted to strike against and release said locking pawl, and to hold the same out of contact with said rack.

5. In a grease gun, in combination, a cylinder, a piston and piston rod therefor, said piston rod having a rack on one side, a cylinder head and handle for said cylinder, a lever pivoted on said handle, a spring actuated operating pawl pivoted on said lever, a spring operated locking pawl pivoted on said handle, a releasing member movable on said handle and adapted to engage and release said operating pawl and simultaneously through the instrumentality of the operating pawl to release the locking pawl, and means for securing the releasing member from movement.

In testimony whereof, I hereunto set my hand this 31st day of June 1910.

WILLIAM E. SHERBONDY.

In presence of—
 GEO. S. COLE,
 WM. M. MONROE.